(12) United States Patent
Julian

(10) Patent No.: US 9,546,694 B2
(45) Date of Patent: Jan. 17, 2017

(54) FLEXIBLE COUPLINGS FOR POWER TRANSMISSION DEVICES

(71) Applicant: Goodrich Corporation, Charlotte, NC (US)

(72) Inventor: Aaron T. Julian, Camden, NY (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/162,977

(22) Filed: Jan. 24, 2014

(65) Prior Publication Data

US 2015/0051003 A1 Feb. 19, 2015

Related U.S. Application Data

(60) Provisional application No. 61/866,160, filed on Aug. 15, 2013.

(51) Int. Cl.
*F16D 3/74* (2006.01)
*F16D 3/00* (2006.01)

(52) U.S. Cl.
CPC .............. *F16D 3/005* (2013.01); *F16D 3/74* (2013.01)

(58) Field of Classification Search
CPC .............. F16D 3/79; F16D 3/005; F16D 3/74
USPC ................................... 464/79, 80, 99
See application file for complete search history.

(56) References Cited

U.S. PATENT DOCUMENTS 2,171,999 A * 9/1939 Weiland ........................ 464/80
4,265,099 A * 5/1981 Johnson et al. ............... 464/99
7,192,355 B2 * 3/2007 Bayer et al. ................... 464/79
8,235,828 B2 * 8/2012 Davies et al. ................. 464/79
8,998,732 B2 * 4/2015 Eichinger
2013/0065696 A1 * 3/2013 Stocco et al. ................. 464/79
2014/0016991 A1 * 1/2014 Kamal ..................... F16D 3/74

FOREIGN PATENT DOCUMENTS

| DE | 2417749 A1 | 10/1974 |
| GB | 929323 A | 6/1963 |
| GB | 1091121 A | 11/1967 |
| WO | WO-9410030 A1 | 5/1994 |
| WO | WO 2012/001281 | * 2/2012 |

OTHER PUBLICATIONS

Coupling Corporation of America, Quill Shafts—Soft Couplings, [online] retriieved from the internet May 12, 2015, http://www.couplingcorp.co/soft-couplings.shtml.*

(Continued)

*Primary Examiner* — Gregory Binda
(74) *Attorney, Agent, or Firm* — Locke Lord LLP; Scott D. Wofsy; Christopher J. Cillié

(57) ABSTRACT

A flexible coupling assembly includes a power transmitting body to carry a torsional load between opposed rotating members and a quill shaft for carrying an axial load extending through the cavity of the torsional body. The power transmitting body defines an axis, a longitudinally extending cavity, and a first and second flanged portions for coupling opposed rotating members. The quill shaft extends through the cavity of the power transmitting body, spanning the power transmitting body, and fixed to the first and second flanged portions for carrying the axial load across the power transmitting body.

18 Claims, 3 Drawing Sheets

(56) References Cited

OTHER PUBLICATIONS

Mancuso, J.R., et al., "What are the Differences in High Performance Flexible Couplings for Turbomachinery?", Proceedings of the 32nd Turbomachinery Symposium (2003), 10 pages, Texas A&M University System Turbomachinery Laboratory, College Station, Texas.
Extended European Search Report received in European Patent Application No. 14180959.0 dated Feb. 15, 2016.

* cited by examiner

FLEXIBLE COUPLINGS FOR POWER TRANSMISSION DEVICES

BACKGROUND OF THE INVENTION

1. Field of the Invention

The present disclosure relates to couplings for connecting rotatable members, and more particularly to flexible couplings for transmitting power and accommodating angular and/or axial misalignments between rotating shafts, such as in aircraft transmission devices.

2. Description of Related Art

Drive systems include power transmission couplings between rotatable members. These couplings transmit power from an engine to a gearbox or from a rotatable driving shaft to a rotatable driven shaft. These shafts can be angularly misaligned, axially misaligned, or both. Flexible couplings capable of carrying high torque and high bending stress are employed for coupling such rotatable members.

Typical couplings include flexible elements such as diaphragm or disc members that provide the required angular and axial compliance for coupling the shafts. In certain situations axial compliance is provided by an external means, such as a movable spline, in which case large axial loads may result that must be resisted by the flexible coupling. Axially loaded flexible couplings generally include a structure for absorbing axial loads while still permitting angular compliance, such as an internally disposed ball and socket for example.

Conventional coupling methods and systems have generally been considered satisfactory for their intended purpose. However, the conventional ball-in-socket structures can be subject to fretting wear, potentially limiting its service life. Conventional ball-socket structures can also generate dust, requiring maintenance and/or replacement. There is a need in the art for flexible couplings that can accommodate large axial loads without corresponding increase in flexible elements stress and which does not require maintenance and replacement. There also remains a need in the art for such a flexible coupling that is easy to make and use. The present disclosure provides a solution for these problems.

SUMMARY OF THE INVENTION

A flexible coupling assembly includes a power transmitting body for transmitting power between opposed rotating members and a quill shaft for resisting an axial load between the between the rotating members. The power transmitting body defines an axis, a longitudinally extending cavity, and a first and second flanged portions for coupling opposed rotating members. The quill shaft extends through the cavity of the power transmitting body and is fixed to the first and second flanged portions of the power transmitting body.

In accordance with certain embodiments, the first and second diaphragm elements can be coupled at their respective outer rim portions. A third diaphragm element adjacent the second diaphragm element can be coupled to the second diaphragm element at its radially inner hub portion. A fourth diaphragm element adjacent the third diaphragm element and second flange portion can couple to the third diaphragm element at its radially outer rim portion. The quill shaft can be internally disposed within each of the plurality of diaphragm discs and the first and second flange portions, and can extend through apertures defined in the inner hub portions of the diaphragm elements. The quill shaft can also extend axially beyond either or both of the seat portions in directions opposite the diaphragm elements.

It is also contemplated that in certain embodiments the first flange portion includes a tapered body defining an inner segment coupled about the inner hub of the first diaphragm element, an outer flanged segment for coupling with the first rotating shaft component, and an intermediate segment extending between the inner segment and flanged segment. The intermediate segment can couple to an end portion of the quill shaft. A first end portion of the quill shaft can define a first seat portion orthogonally arranged with respect to the quill shaft and coupled about its periphery to an interior surface of the first flange portion.

In certain embodiments the second flange portion includes an axial extending body defining an inner segment coupled about the inner hub of the second diaphragm element, an outer flanged segment for coupling with the second rotating shaft component, and an intermediate segment. The intermediate segment can extend axially between the inner and flanged segments and couple to a second end portion of the quill shaft. A second end portion of the quill shaft can define a second seat portion orthogonally arranged with respect to the quill shaft and coupled about its periphery to an interior surface of the second flange portion.

The axial length of the quill shaft can be greater than an axial length of the diaphragm elements. The diaphragm elements can be optimized for absorbing torsional stress. The quill shaft can be optimized to longitudinally bend in concert with the flexible diaphragm discs. The quill shaft can also be configured to carry an axial load across the diaphragm discs.

A flexible diaphragm coupling assembly includes an annular diaphragm element configured for absorbing torsional stress and coupling between first and second rotating shaft components. The annular diaphragm element includes a flexible diaphragm portion extending radially between an inner hub portion and an outer rim portion. A first flange portion configured for mating with the first shaft component couples to the inner hub portion of the annular diaphragm element. An opposed second flange portion configured for mating with the second shaft component couples to the outer rim portion of the diaphragm element. A quill shaft configured to carry an axial load across the diaphragm element couples to the first and second flange portions and extends through an aperture defined within the inner hub portion of the diaphragm element.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
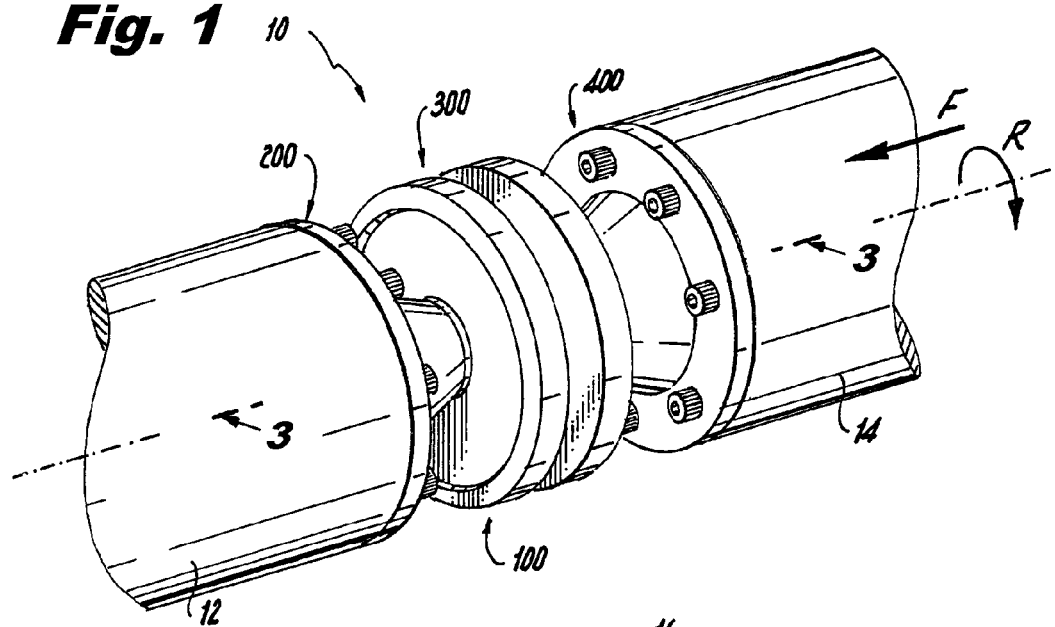
FIG. 1 is a perspective side view of a flexible coupling assembly connecting opposed rotating shafts, showing an axial force opposed by the coupling assembly and rotational power transmitted by the coupling assembly.

Reference will now be made to the drawings wherein like reference numerals identify similar structural features or aspects of the subject disclosure. For purposes of explanation and illustration, and not limitation, a partial view of an exemplary embodiment of the coupling assembly in accordance with the disclosure is shown in FIG. 1 and is designated generally by reference character 100. Other embodiments of the coupling assembly in accordance with the disclosure, or aspects thereof, are provided in FIGS. 2-4, as will be described. The systems and methods described herein can be used in both industrial and aerospace applications, such as for aircraft engine power takeoff shafts for example.

FIG. 1 shows a power transmission system 10 including a flexible coupling assembly 100 connecting a first rotating member 12 to a second rotating member 14, e.g. shafts. Flexible coupling assembly 100 includes a first flanged portion 200, a power transmitting body 300, and a second flanged portion 400. Flexible coupling assembly 100 is configured to transfer power, e.g. rotational force R, from one of the rotational members to the other of the rotational members and accommodate axial misalignment of first rotating member 12 and second rotation member 14. Flexible coupling assembly 100 is also configured to oppose an axial force F from one of the rotation members to the other of the rotational members by transferring the axial load from one of the flanged bodies to the other of the flanged bodies, thereby isolating power transmitting body 300 from axial load F.

Flexible coupling assembly 100 transfers shaft power, e.g. torque at speed, from first rotating member 12 to second rotating member 14 while permitting angular misalignment between the members. Flexible coupling assembly 100 also simultaneously limits axial deflection or accommodates a large axial force between the misaligned rotating members. In the illustrated embodiment, as will be described, power transmitting body 300 is a flexible diaphragm coupling. As will be appreciated by those skilled in the art, the power transmitting body can be of a diaphragm-type, disc-type, flex-frame/link-type, or other type of coupling as may be suitable for a given power transmission application.

Figure 2:
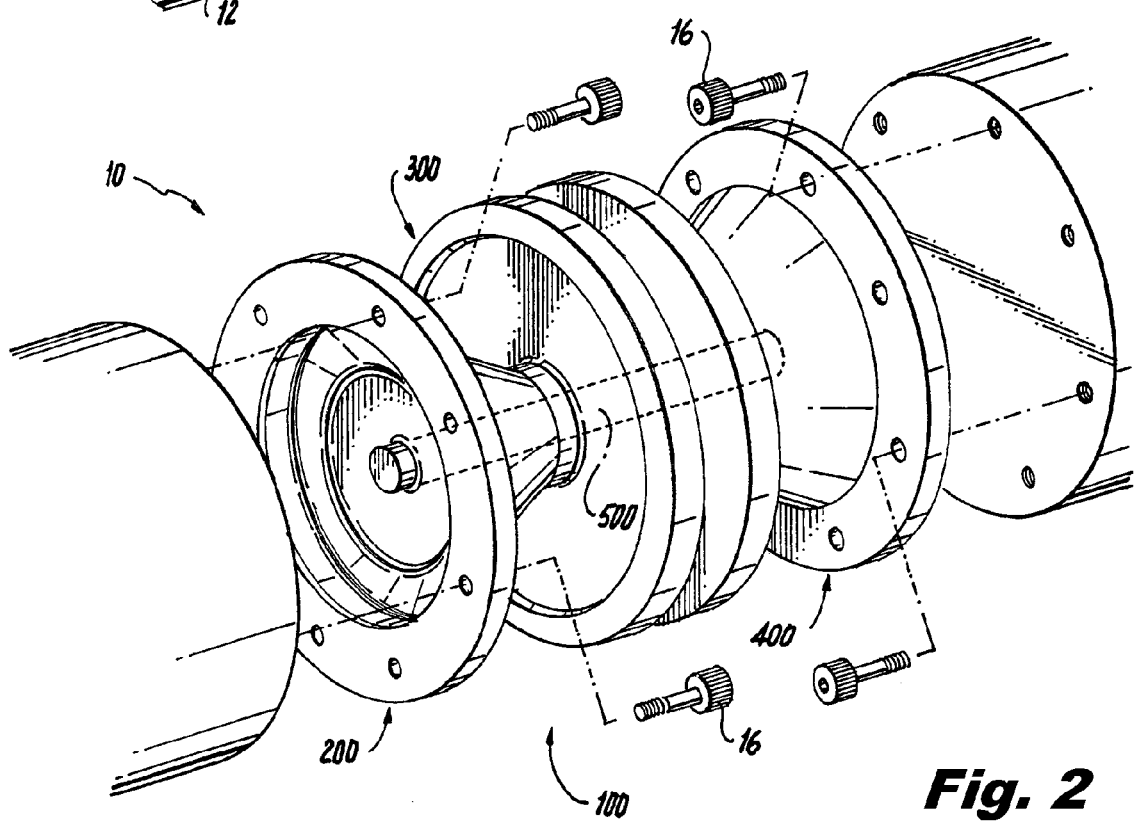
FIG. 2 is an exploded perspective side view of the flexible coupling assembly of FIG. 1, showing the flange portions, power transmitting body, and quill shaft of the coupling assembly.

With reference to FIG. 2, flexible coupling assembly 100 is shown in an exploded view. First flanged portion 200 and second flanged portion 400 are integrally fixed to power transmitting body 300. Each of first flanged portion 200 and second flanged portion 400 defines a flange having a plurality of fastener apertures for receiving fasteners 16. Fasteners 16 fixedly connect flexible coupling assembly 100 to first and second rotating members 12 and 14. First flanged portion 200 and second flanged portion 400 are integral with power transmitting body 300, and in embodiments are fabricated as an integral weldment.

Power transmitting body 300 includes a quill shaft 500, partially shown in dashed lines, extending through a central cavity 110 (shown in FIG. 3) defined within flexible coupling assembly 100. Quill shaft 500 couples to first flanged portion 200 on a first end, and couples to second flanged portion 400 on a second end. Quill shaft 500 spans at least a portion of power transmitting body 300, extending through the cavity defined therein without contacting power transmitting body 300. In embodiments, quill shaft 300 has a relatively small and a tubular shape width such that it bends in concert with power transmitting portion 300, carries an axial load between the rotating members 12 and 14, and resists loads applied in the axial direction. Deflections are accommodated by material flexure within the material elastic limits while relatively high axial stiffness allows for carrying large axial loads. This provides for an assembly that is light in weight in comparison to conventional coupling assemblies.

Figure 3:
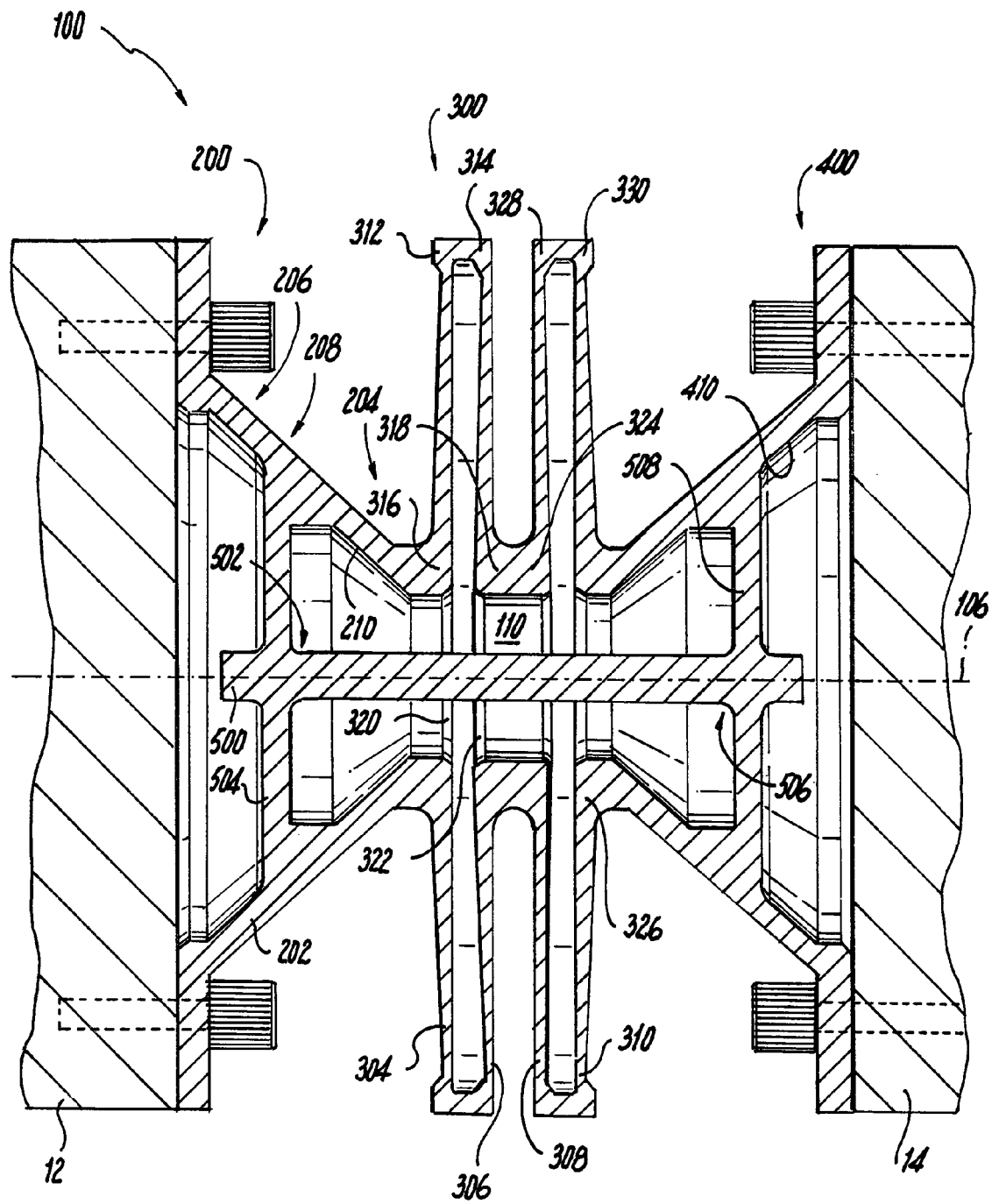
FIG. 3 is cross-sectional side view of the flexible coupling assembly of FIG. 1, showing the internal cavity of the coupling assembly.

With reference to FIG. 3, flexible coupling assembly 100 is shown in a cross-sectional side view. Power transmitting body 300 includes an integral first annular disc 304, a second annular disc 306, a third annular disc 308, and a fourth annular disc 310. First annular disc 304 is axially adjacent to first flanged portion 200 and second annular disc 306. Second annular disc 306 is axially adjacent to third annular disc 308. Third annular disc 308 is axially adjacent to fourth annular disc 310. Fourth annular disc 310 is axially adjacent to second flanged portion 400. First annular disc 304, second annular disc 306, third annular disc 308, and fourth annular disc 310 also define respective inner hub portions, outer rim portions, and a flexible diaphragm portions extending between the inner hub and outer rim portions. Each of first annular disc 304, second annular disc 306, third annular disc 308, and fourth annular disc 310 also define an aperture extending through the annular disks, quill shaft 500 extending through each of the respective apertures.

First annular disc 304 and second annular disc 306 couple to one another at respective outer rim portions 312, 314. Third annular disc 308 and fourth annular disc 310 couple to one another at respective outer rim portions 328 and 330. First annular disc 304 couples to first flanged portion 200 at its inner hub portion 316. Second annular disc 306 and third annular disc 308 couple to one another at their respective inner hub portions 318 and inner hub portion 324. Fourth annular disc 310 couples to second flanged portion 400 at its inner hub portion 326.

The flexible diaphragm portions of first annular disc 304, second annular disc 306, third annular disc 308, and fourth annular disc 310 are configured for absorbing torsional stress associated with transmitting power between first and second rotating members 12 and 14. In the illustrated embodiment, flexible coupling assembly 100 includes first annular disc 304, second annular disc 306, third annular disc 308, and fourth annular disc 310. As will be appreciated by those skilled in the art, flexible coupling assembly 100 can include as few as two and as many as eight flexible diaphragms as may be suitable for given applications embodiments of the coupling assemblies described herein.

The flexible diaphragm portions of first annular disc 304, second annular disc 306, third annular disc 308, and fourth annular disc 310 have a contoured and an axially opposed planar face. As illustrated, the diaphragm portions taper from a relatively thick cross-section near an inner hub portion to a minimum thickness near the outer rim portion of the annular disc. Inner hub portion 316, inner hub portion 318, inner hub portion 324, and inner hub portion 326 define apertures suitably sized to receive and allow for longitudinal flexure of a quill shaft 500 (shown in FIG. 4). 500. Quill shaft 500 is suspended with the apertures and free to bend without contacting the diaphragm discs while carrying an axial load across power transmitting body 300. First annular disc 304, second annular disc 306, third annular disc 308, and fourth annular disc 310 are configured for absorbing torsional stress, such as with a diaphragm profile formed or optimized, for example, for absorbing shear stress while being relatively compliant under an axial load. As will be appreciated by those skilled in the arts, carrying axial loads across the power transmitting body allows for configuring the point of minimum thickness on the diaphragm disc at a location suited for torsional stress and unsuitable for axial loads First flanged portion 200 includes an axially extending tapered body 202 defining an inner segment 204 coupled about inner hub portion 316 of first annular disc 304. First flanged portion 200 also includes a radially outer flanged segment 206 connected to first rotating member 12. An intermediate segment 208 extends between inner segment 204 and outer flanged segment 206 and has an obliquely oriented interior surface 210. A portion of interior surface 210 defines a central cavity 110 configured for receiving quill shaft 500. Second flanged portion 400 is similarly structure with corresponding structure.

Quill shaft 500 has a body with a first end portion 502 and a second end portion 506. First end portion 502 defines a first seat portion 504 that is substantially orthogonal with respect to a longitudinal axis of quill shaft 500 and couples about its periphery to interior surface 210. First seat portion 504 is disposed within the cavity defined by first flanged portion 200 and couples to intermediate segment 208. In the illustrated embodiment, the body of quill shaft 500 extends longitudinally beyond first seat portion 504 and has a greater length than power transmitting body 300. Second end portion 506 is similarly formed with corresponding structure.

Quill shaft 500 is configured to accept and resist axial loads, such as by having a shape formed, or optimized for example, to resist column buckling. As described above, quill shaft 500 can be a hollow tube of relatively small diameter formed from a material capable of incurring repetitive bending cycles as flexible coupling assembly 100 rotates. This allows quill shaft 500 to bend longitudinally about its longitudinal axis in concert with flexure of power transmitting body 300 as flexible coupling assembly 100 rotates while carrying an axial load. This allows for power transmitting body to be configured, or optimized for example, for transmitting power and accommodating torsional stress. Since design of flexible diaphragm disc assemblies are generally a compromise between axial load carrying capability and ability to accommodate torsional stress, embodiments of the coupling assemblies described herein can include power transmitting bodies optimized for transmitting power and accommodating torsional stress without accommodating axial loads because of ability of the quill shaft to resist axial loads.

Figure 4:
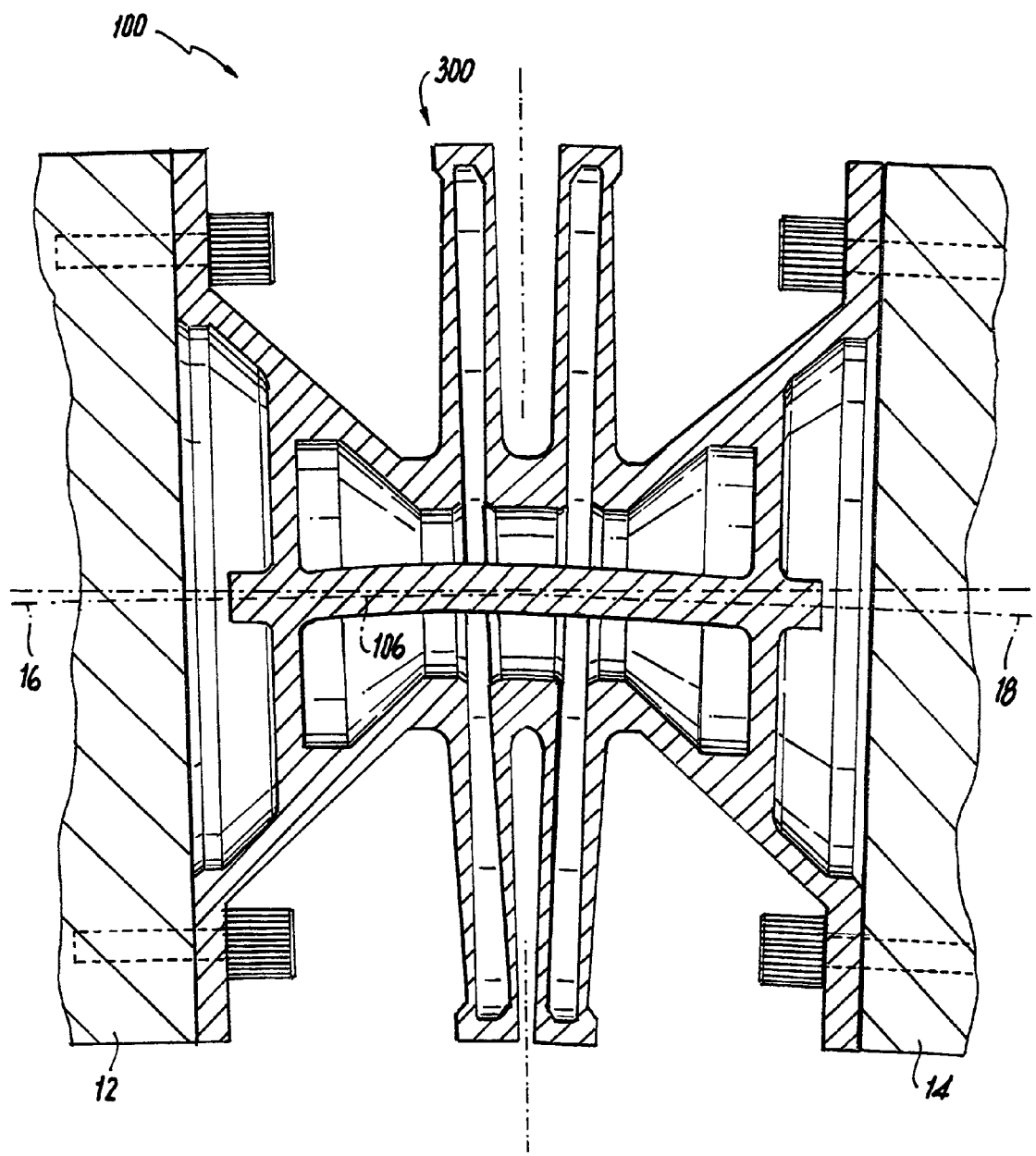
FIG. 4 is a cross-sectional side view of the flexible coupling of FIG. 1, showing the coupling assembly bending to accommodate misalignment between opposed rotating members.

With reference to FIG. 4, flexible coupling assembly 100 is shown transmitting power between first and second rotating members 12 and 14 in a misaligned configuration. Quill shaft 500 bends in concert with power transmitting body 300 such that longitudinal axis 106 intersects axis 18 of first rotating member 12 on one end, and intersects axis 18 of second rotating member 14 on its other end. In doing so quill shaft 500 beings in concert with power transmitting body 300 while resisting loads applied along longitudinal axis 106 of flexible coupling assembly 100. This allows power transmitting body 300 to be configured for carrying torsional load between first and second rotating members 12 and 14, and in embodiments, for consideration of axial loading to be subordinated its design.

Quill shafts as described herein can be longitudinally centered within the coupling assembly and along the axis of rotation of the assembly. This allows the quill shaft to bend as the flexible coupling bends and resist loads applied in the axial direction of the coupling assembly. Power transmitted through the flexible coupling has a relatively minimal effect on the internal quill shaft owing to its relatively small radial diameter. The axial-load bearing quill shaft does not fret or wear, and therefore requires little or no maintenance or replacement. As will be appreciated by those skilled in the art, deflections are accommodated by material flexure within the shaft material elastic limits while the relatively high axial stiffness of the quill shaft allows the coupling assembly to accept large axial loads.

The methods and systems of the present disclosure, as described above and shown in the drawings, provide for flexible coupling assemblies with superior properties including reduced weight and improved tolerance for axial loading. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A flexible coupling assembly for a power transmission system, comprising:
   a power transmitting body configured to transmit power between opposed first and second rotating members, defining:
     an axis; and
     a longitudinally extending cavity;
     a first flanged portion for coupling the body to a first rotating member;
     a second flanged portion for coupling the body to a second rotating member,
     a diaphragm disc axially interposed between the first flanged portion and the second flanged portion; and
   a quill shaft configured for resisting an axial load between the rotating members, wherein the quill shaft extends through the cavity of the power transmitting body without contacting the power transmitting body and is fixed to the first and second flanged portions,
   wherein the first flanged portion has a tapered body, defining:
     a radially inner segment axially adjacent to the diaphragm disc;
     a radially outer flanged segment disposed on a side of the radially inner segment axially opposite the diaphragm disc; and
     a radially intermediate segment extending between the radially inner segment and the radially outer segment,
     wherein a seat portion coupling an end of the quill shaft to the to the radially intermediate segment is orthogonal to relative to the quill shaft along a length of the seat portion.

2. A coupling assembly as recited in claim 1, wherein the power transmitting body is a flexible diaphragm coupling.

3. A coupling assembly as recited in claim 1, wherein the diaphragm disc is a first diaphragm disc, the power transmitting body defining a second diaphragm disc.

4. A coupling assembly as recited in claim 3, wherein the first and second diaphragm discs are axially adjacent to one another.

5. A coupling assembly as recited in claim 3, wherein the diaphragm discs are coupled at respective outer rim portions.

6. A coupling assembly as recited in claim 3, wherein the first diaphragm disc is coupled the first flanged portion at an inner hub portion.

7. A coupling assembly as recited in claim 3, wherein the second diaphragm disc is coupled to the second flanged portion at an inner hub portion.

8. A coupling assembly as recited in claim 3, wherein the first and second diaphragm discs define apertures having, wherein the quill shaft extends through the apertures of the first and second diaphragm discs.

9. A coupling assembly as recited in claim 3, wherein the quill shaft is internally disposed within each of the diaphragm discs and the flanged portions.

10. A coupling assembly as recited in claim 3, including:
a third diaphragm disc adjacent the second diaphragm disc; and
a fourth diaphragm disc adjacent the third diaphragm disc and the second flanged portion, wherein the second and third diaphragm disc are coupled at respective inner hub portions, and wherein the third and fourth diaphragm discs are coupled at their respective outer rim portions.

11. A coupling assembly as recited in claim 3, wherein the flexible diaphragm discs are configured for absorbing torsional stress.

12. A coupling assembly as recited in claim 3, wherein an axial length of the quill shaft is greater than an axial length of the diaphragm discs.

13. A coupling assembly as recited in claim 1, wherein the quill shaft extends axially beyond the seat portion in a direction opposite the diaphragm disc.

14. A coupling assembly as recited in claim 1, wherein the second flanged portion includes:
an axially extending body defining:
a radially inner segment coupled to the second diaphragm disc;
an a radially outer flanged segment for coupling with the second rotating member; and
a radially intermediate segment extending between the radially inner segment and the radially outer flanged segment coupled to a second end portion of the quill shaft.

15. A coupling assembly as recited in claim 14, wherein the second end portion of the quill shaft defines a second seat portion orthogonally arranged with respect to the quill shaft and coupled about its periphery to an interior surface of the radially outer flanged portion.

16. A coupling assembly as recited in claim 15, wherein the quill shaft extends axially beyond the second seat portion in a direction opposite the second diaphragm disc.

17. A coupling assembly as recited in claim 1, wherein the quill shaft is configured to longitudinally bend in concert with the power transmitting body while carrying an axial load across the power transmitting body.

18. A flexible coupling assembly, comprising:
a power transmitting body configured to carry a torsional load between opposed rotating members, defining:
an axis;
a longitudinally extending cavity;
a first flanged portion for coupling the body to a first rotating member;
a second flanged portion for coupling the body to a second rotating member; and
a solid quill shaft arranged along a centerline of rotation of the power transmitting body configured to bend in concert with the power transmitting body coupling and resist loads applied along the axis of the power transmitting body,
wherein the first flanged portion includes a tapered body, defining:
an inner segment coupled about the inner hub of a first diaphragm disc;
an outer flanged segment for coupling with the first rotating shaft component; and
an intermediate segment extending between the inner segment and flanged segment coupled to a first end portion of the quill shaft,
wherein the longitudinally extending cavity radially separates the quill shaft from the power transmitting body such that the quill shaft extends through the longitudinally extending cavity without contacting the power transmitting body.

* * * * *